United States Patent [19]
Roeckner et al.

[11] Patent Number: 5,805,466
[45] Date of Patent: Sep. 8, 1998

[54] DEVICE AND METHOD FOR CALIBRATING A SIGNAL

[75] Inventors: William J. Roeckner, Carpentersville; Timothy T. Rueger, Rolling Meadows, both of Ill.

[73] Assignee: Motorola Inc., Schaumburg, Ill.

[21] Appl. No.: 757,178

[22] Filed: Nov. 27, 1996

[51] Int. Cl.$^6$ .................................................. G01N 7/00
[52] U.S. Cl. ........................... 364/558; 364/571.04
[58] Field of Search ................. 364/571.01–571.08, 364/558, 579, 580; 324/601, 130; 70/1.01

[56] References Cited

U.S. PATENT DOCUMENTS

| | | | |
|---|---|---|---|
| 4,633,422 | 12/1986 | Brauer | 364/571 |
| 4,982,351 | 1/1991 | Kawate et al. | 364/571.01 |
| 5,241,850 | 9/1993 | Kawate . | |
| 5,377,128 | 12/1994 | McBean | 364/571.04 |
| 5,502,656 | 3/1996 | Fulcher et al. | 364/550 |

OTHER PUBLICATIONS

"A Smart Pressure Sensor with On–Chip Calibration and Compensation Capability" by Obermeier, Hein, Schlichting, Hammerschmidt, Schnatz, and Hosticka; Sensors, Mar. 1995.

"Micromachines on the March" by Bryzek, Petersen, and McCulley, IEEE Spectrum, May, 1994.

*Primary Examiner*—James P. Trammell
*Attorney, Agent, or Firm*—Michael L. Smith

[57] ABSTRACT

An electronic device (10) includes a signal processor (14) receiving an input signal requiring calibration, a data storage device (38) providing calibration data to the signal processor (14), a calibration controller (32) allowing the calibration data to be written to the data storage device (38) across at least an output terminal (22), and such that the signal processor (14) produces a calibrated output signal via an output driver (30) to the output terminal (22).

14 Claims, 1 Drawing Sheet

DEVICE AND METHOD FOR CALIBRATING A SIGNAL

FIELD OF THE INVENTION

This invention is generally directed to signal calibration in electronic devices. More specifically, the present invention is directed to signal calibration in electronic devices wherein the calibration is achieved using preexisting pins of the electronic device.

BACKGROUND OF THE INVENTION

Prior art devices requiring calibration of signals such as pressure sensor products typically require calibration before final manufacturing steps have been completed. This can result in the pressure sensor products falling out of calibration due to packaging induced stress, media isolation effects, and other factors.

For example, it is well known in the art to use laser trimming of thin film resistors to achieve temperature compensation in calibration of gain and offset in pressure sensor products. This laser trimming requires the pressure sensor package to be opened and necessitates a post trim, or post calibration, module assembly and test. This type of calibration can limit the achievable performance of a pressure sensor product due to post calibration packaging shifts.

Other prior art pressure sensor products have electrically calibrated or trimmed modules. However, these prior art electrically calibrated pressure sensor products require the use of dedicated pins to perform the calibration functions. Thus, extra pins are needed to be manufactured into the final pressure sensor product. The advantage of this electrical calibration over the laser trimming of resistors is readily apparent. For example, the pressure sensor product can be completely assembled which allows the trim and final test to occur at the same time, thus streamlining the manufacturing process. In addition, costly laser trim hardware can be replaced with a much simpler and less expensive calibration system.

Thus, it would be desirable to have a pressure sensor or other electronic device product that can be electrically calibrated without the need for additional pins.

BRIEF DESCRIPTION OF THE DRAWINGS

For a more complete understanding of the present invention reference should be made to the drawings, where.

DETAILED DESCRIPTION OF A PREFERRED EMBODIMENT

The present invention provides an electrical device comprising a signal processor receiving an input signal requiring calibration, a data storage device providing calibration data to the signal processor, a calibration controller allowing the calibration data to be written to and received from a data storage device across an output terminal of the electronic device, and wherein the signal processor produces a calibrated output signal to the output terminal. This invention allows electrical trimming of a completely assembled sensor (not shown) using as few as one existing terminal of the module. The output terminal can be reconfigured from an analog output to a serial digital input/output port by use of an identifiable voltage signal applied to the pre-existing output terminal and detected by a calibration mode detector.

Figure 1:
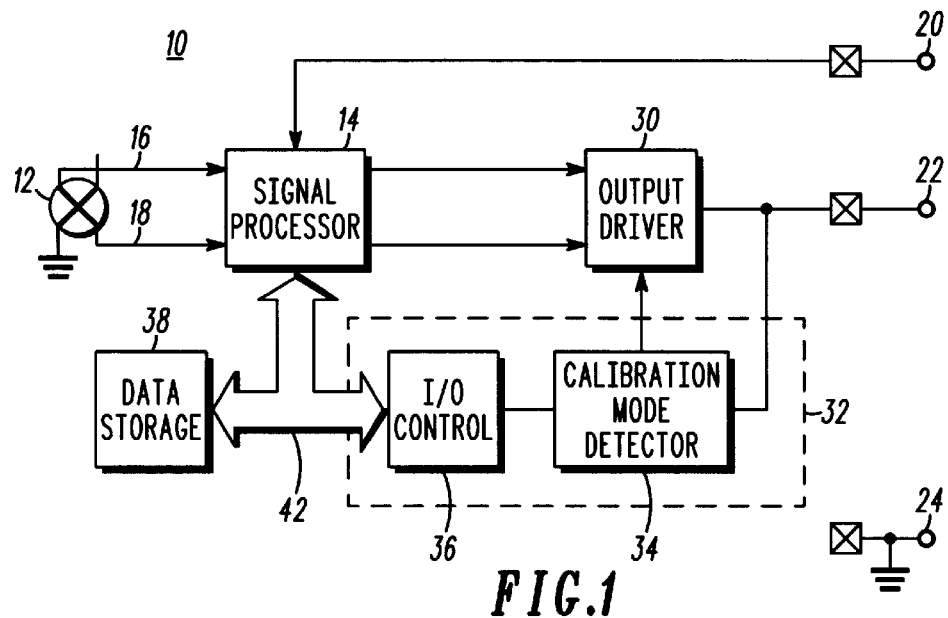
FIG. 1 is a block diagram of an electronic device in accordance with the present invention.

FIG. 1 shows a block diagram of a preferred embodiment of the present invention. The electronic device 10 in this case includes a pressure sensor element 12; but, as those skilled in the art will appreciate, other elements or signals could be inputted to signal, processor 14 across lines 16 and 18. The sensor element 12 is used for illustrative purposes only and should not be read to limit the scope of the present invention. All of the elements depicted in FIG. 1 including pressure sensor element 12 are preferably contained within a monolithic device and the completely assembled package includes external leads 20, 22, and 24, which are the power supply, output, and ground, respectively.

In normal use, signal processor 14 receives an input signal requiring calibration along lines 16 and 18 and then produces a calibrated signal through output driver 30 and across the output terminal 22.

During calibration, an external calibration signal is applied to output terminal 22. This signal is received by calibration controller 32, which includes calibration mode detector 34 and I/O (input/output) control 36. When calibration mode detector 34 determines that a calibration mode signal has been received, the detector 34 disables output driver 30 and enables I/O control 36.

Once I/O control 36 is enabled, calibration data is allowed to be written to the data storage device 38 across output terminal 22. As those skilled in the art will appreciate, data storage device 38 could be any form of non-volatile memory including EPROM, EEPROM, or fusible links. When the electronic device 10 has been properly calibrated, the signal processor 14 uses the calibration data stored in the data storage device 38 via bus 42 to produce a calibrated output signal via output driver 30 at output terminal 22.

As those skilled in the art will appreciate, the calibration mode signal that is detected by calibration mode detector 34 could be any of a number of possible signals. For example, the calibration mode signal could be an AC signal applied at a particular level and at a predetermined frequency. When calibration mode detector 34 detects this level and frequency, it disables output driver 30 and enables I/O control 36. When the calibration mode signal is initially applied at output terminal 22, the AC signal overdrives output driver 30 until the output driver is disabled by calibration mode detector 34.

Preferably, a serial data protocol is used to perform data reading and writing through output terminal 22. Preferably, Manchester encoding is used to provide a self-clocking bit stream. This allows the electronic device 10 to quickly lock to the asynchronous incoming calibration data.

Figure 2:
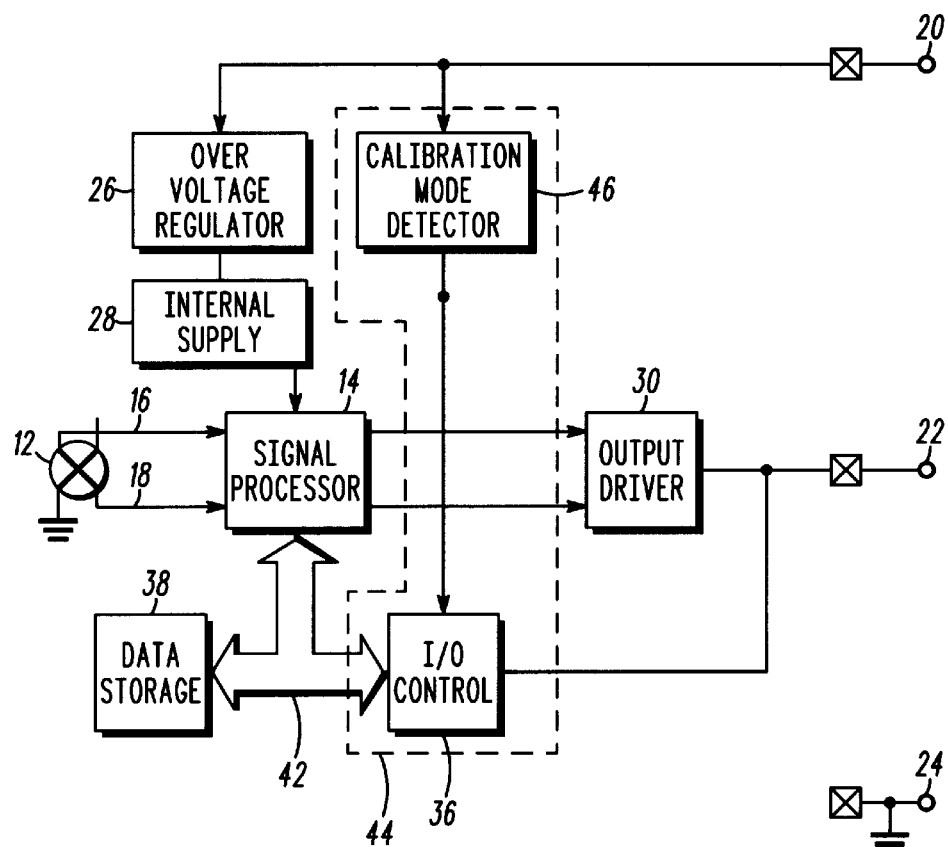
FIG. 2 is a block diagram of an alternative embodiment of an electronic device in accordance with the present invention.

The alternative embodiment of the present invention shown in FIG. 2 is essentially the same as that described above in FIG. 1. The only difference is that calibration controller 44 is also connected to power supply terminal 20 wherein a calibration mode detector 46 detects a calibration mode signal applied to power supply terminal 20. In this preferred embodiment, calibration mode detector 46 preferably detects the level of supply voltage and when the voltage exceeds a threshold amount for a predetermined period of time, the detector 46 then disables output driver 30 and enables I/O control 36. Additionally, overvoltage regulator 26 is used to isolate internal supply voltage 28 from external supply terminal 20, protecting internal circuitry from excessively high voltage levels. Calibration data can then be written to data storage device 38 across output terminal 22.

As those skilled in the art will appreciate, data storage device 38 could be any form of non-volatile memory including EPROM, EEPROM, or fusible links.

In the application of this invention to a pressure sensor, electronic device 10 is subjected to known pressures at known temperatures during factory calibration. Measurements of the behavior of pressure sensor element 12 are taken at each pressure and temperature. This measurement data is used to determine calibration data to be stored in data storage device 38. The widely varying response of pressure sensor element 12 is thus calibrated or normalized over a given temperature range by the previously determined calibration data.

The calibration data adjusts the response of the pressure sensor element 12 via signal processor 14. One possible method of calibration is accomplished by signal processor 14 performing an evaluation of any of several known predetermined functions that represent a desired output characteristic of the electronic device 10. Using the response of pressure sensor element 12 and calibration data stored in data storage device 38, signal processor 14 produces a calibrated output signal via output driver 30 at output terminal 22.

Thus, there has been shown and described a specific embodiment of the invention. Further modifications and improvements will occur to those skilled in the art. All modifications retaining the basic underlying principles disclosed and claimed here in are within the scope of this invention.

What is claimed is:

1. An electronic device having at least an output terminal comprising:

a signal processor receiving an input signal requiring calibration;

a data storage device providing calibration data to the signal processor;

a calibration controller allowing the calibration data to be written to the data storage device across at least the output terminal; and wherein the signal processor produces a calibrated output signal to the output terminal.

2. The device of claim 1 further including a pressure sensor element providing the input signal to the signal processor.

3. The device of claim 2 wherein the pressure sensor element is piezoresistive.

4. The device of claim 2 wherein the device is a monolithic device.

5. The device of claim 1 wherein the data storage device includes non-volatile memory.

6. The device of claim 1 wherein the calibration controller further allows the calibration data to be read from the data storage device.

7. The device of claim 1 wherein the calibration controller further includes:

a calibration mode detector attached to the output terminal; and an input controller responsive to the calibration mode detector controlling the calibration data written to the data storage device.

8. The device of claim 1 wherein the calibration controller further includes:

a calibration mode detector attached to a terminal of the electronic device other than the output terminal; and an input controller responsive to the calibration mode detector and controlling the calibration data written to the data storage device through the output terminal.

9. A pressure sensor device having at least an output terminal, a power supply terminal, and a ground terminal, the pressure sensor device comprising:

a pressure sensor element producing a pressure signal indicative of an applied pressure wherein the pressure signal requires calibration;

a signal processor coupled to the pressure sensor element and receiving the pressure signal;

a data storage device coupled to the signal processor and providing calibration data to the signal processor;

an input and output control connected between the data storage device and the output terminal and allowing the calibration data to be written to and read from the data storage device via the output terminal;

a calibration mode enabler connected to the input and output control and one of the output and power supply terminals, wherein the calibration mode enabler enables the input and output control; and wherein the signal processor produces a calibrated output signal to the output terminal.

10. The device of claim 9 wherein the pressure sensor element is piezoresistive.

11. The device of claim 9 wherein the device is a monolithic device.

12. The device of claim 9 wherein the data storage device includes non-volatile memory.

13. An electronic device comprising:

signal processing means for producing a calibrated signal to an output terminal of the device;

storage means coupled to the signal processing means for storing calibration data to be used by the signal processing means; and calibration control means coupled to the storage means for controlling a writing of the calibration data to and a reading of the calibration data from the storage means through the output terminal.

14. A method of calibrating a signal in an electronic device comprising the steps of:

providing a data storage device for storing calibration data;

controlling with a calibration controller a writing of the calibration data to the data storage device through an output terminal of the electronic device;

receiving the signal with a signal processor;

calibrating the signal with the signal processor and the calibration data from the data storage device; and providing a calibrated signal to the output terminal.

* * * * *

UNITED STATES PATENT AND TRADEMARK OFFICE
CERTIFICATE OF CORRECTION

PATENT NO.    : 5,805,466
DATED         : September 8, 1998
INVENTOR(S)   : William Roeckner et al.

It is certified that error appears in the above-identified patent and that said Letters Patent is hereby corrected as shown below:

Drawings,
Figure 2 should be deleted and replaced with the corrected Figure 2 as shown below.

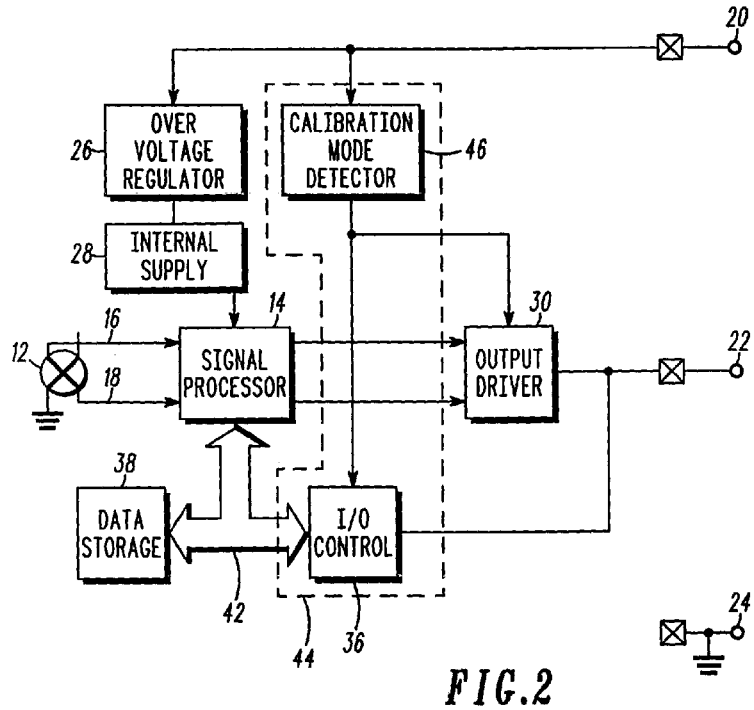

FIG.2

Signed and Sealed this

First Day of April, 2003

JAMES E. ROGAN
*Director of the United States Patent and Trademark Office*